(12) United States Patent
Kim et al.

(10) Patent No.: US 9,890,984 B2
(45) Date of Patent: Feb. 13, 2018

(54) SUPERCOOLING REFRIGERATOR AND METHOD FOR CONTROLLING THE SAME

(75) Inventors: Tai Ho Kim, Seoul (KR); Byung Suhn Ahn, Seoul (KR)

(73) Assignees: SUPERCOOLER, INC., Incheon (KR); SUPER COOLER USA, INC., New York, NY (US); GINA AHN, Woodcliff Lake, NJ (US)

( * ) Notice: Subject to any disclaimer, the term of this patent is extended or adjusted under 35 U.S.C. 154(b) by 365 days.

(21) Appl. No.: 14/409,535

(22) PCT Filed: Jun. 28, 2012

(86) PCT No.: PCT/KR2012/005121
§ 371 (c)(1),
(2), (4) Date: Mar. 10, 2015

(87) PCT Pub. No.: WO2014/003220
PCT Pub. Date: Jan. 3, 2014

(65) Prior Publication Data
US 2015/0323237 A1    Nov. 12, 2015

(51) Int. Cl.
*F25D 23/12* (2006.01)
*F25B 41/00* (2006.01)
(Continued)

(52) U.S. Cl.
CPC .............. *F25C 1/00* (2013.01); *F25D 17/062* (2013.01); *F25B 2600/112* (2013.01);
(Continued)

(58) Field of Classification Search
CPC ...... F25D 17/062; F25D 17/04; F25D 23/025; F25D 25/04; F25D 2317/0651;
(Continued)

(56) References Cited

U.S. PATENT DOCUMENTS

| 5,345,778 A | 9/1994 | Roberts |
| 2001/0009100 A1* | 7/2001 | Ohya ................... F25D 17/065 62/441 |

(Continued)

FOREIGN PATENT DOCUMENTS

| CN | 1322291 | 11/2001 |
| CN | 102159908 | 8/2011 |

(Continued)

*Primary Examiner* — Joseph Trpisovsky
(74) *Attorney, Agent, or Firm* — Lex IP Meister, PLLC

(57) ABSTRACT

Provided is a supercooling refrigerator including, so as to supercool foods such as fish or meat and more uniformly and stably maintain a temperature in a storage chamber supercooling the foods, a body including a storage chamber storing goods such as the fish or meat in a supercooled state, a door installed in the body, a plurality of shelves installed in the storage chamber, on which the goods are stored, a cooling unit cooling internal air of the storage chamber, a cooling air supplying unit circulating the air cooled by the cooling unit into the storage chamber, and a cool air controlling unit controlling the temperature of the cool air supplied from the cool air supplying unit in a supercooling temperature range of the stored goods.

6 Claims, 7 Drawing Sheets

(51) Int. Cl.
*F25C 1/00* (2006.01)
*F25D 17/06* (2006.01)
*F25D 23/02* (2006.01)
*F25D 25/04* (2006.01)

(52) U.S. Cl.
CPC ............ *F25D 23/025* (2013.01); *F25D 25/04* (2013.01); *F25D 2317/0651* (2013.01); *F25D 2317/0682* (2013.01); *F25D 2400/02* (2013.01); *F25D 2700/02* (2013.01); *F25D 2700/122* (2013.01); *Y02B 30/743* (2013.01)

(58) Field of Classification Search
CPC ......... F25D 2317/0682; F25D 2400/02; F25D 2700/02; F25D 2700/12; F25D 2700/121; F25D 2700/1235; F25D 2600/06; F25B 2600/112
USPC .......................................... 62/256, 208, 209
See application file for complete search history.

(56) References Cited

U.S. PATENT DOCUMENTS

2007/0163290 A1* 7/2007 Shin ...................... F25D 17/045
 62/408
2008/0245081 A1* 10/2008 Shin ........................ F25D 23/12
 62/80

FOREIGN PATENT DOCUMENTS

| EP | 1878986 | 1/2008 |
| JP | 2008-164273 | 7/2008 |
| JP | 2009-145041 | 7/2009 |
| KR | 10-2005-0001142 | 1/2005 |
| KR | 10-2008-0009216 | 1/2008 |
| KR | 10-2009-0028362 | 3/2009 |
| KR | 10-2009-0031076 | 3/2009 |
| KR | 10-2009-0124496 | 12/2009 |
| KR | 10-2010-0069423 | 6/2010 |
| KR | 10-2010-0110118 | 10/2010 |
| KR | 10-2011-0089575 | 8/2011 |
| KR | 10-2011-0137430 | 12/2011 |
| WO | 2011/121285 | 10/2011 |

* cited by examiner

100

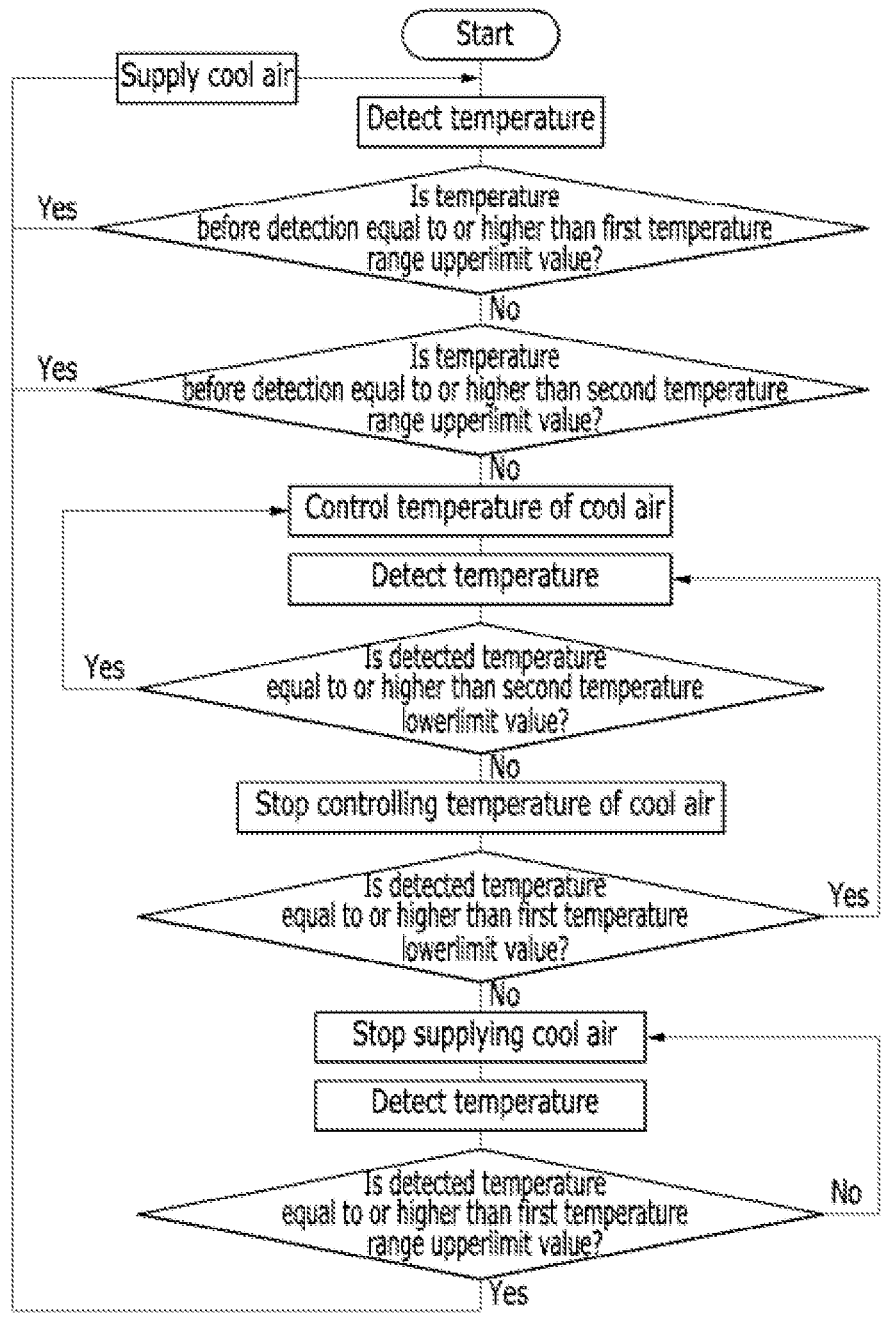

SUPERCOOLING REFRIGERATOR AND METHOD FOR CONTROLLING THE SAME

BACKGROUND OF THE INVENTION (a) Field of the Invention

The present invention relates to a refrigerator that supercools food and stores the supercooled food. More particularly, the present invention relates to a supercooling refrigerator and a method for controlling the same, which easily control a temperature.

(b) Description of the Related Art

In general, food including fish or meat is stored by using a refrigerating device. The refrigerating device is a device for long-term storage of stored goods by decreasing a temperature in an airtight storage chamber to a temperature lower than an external temperature. The refrigerating device includes a refrigeration cycle in which refrigerant is circulated to refrigerate the stored goods through cool air generated while absorbing ambient heat when a refrigerant in a liquid state is evaporated.

The refrigerating device cooling-controls the temperature of the storage chamber storing the food to a temperature below freezing to refrigerate the food. When the food such as the meat or the fish is refrigerated and kept at a low temperature as described above, water included in the food is frozen. Therefore, while the water is frozen, the volume of the food increases and cells are destroyed or only water in the cell is first frozen and water is extricated from tissue, and as a result, an ice crystal is separately generated. Therefore, when the refrigerated food is defrosted, the food is deformed from an original state to lose flavor thereof.

Further, a difference in temperature between the surface and the center of the food stored in a storage chamber becomes large, and as a result, freezing speeds of the surface and the center of the food are different from each other. Therefore, since an ice crystal is formed to grow from the surface to the center of the food, cell destruction of the food increases toward the center of the food.

Further, a phenomenon continuously occurs in which while water at the center of the food is phase-transited to ice, a temperature increases to a freezing point again. Therefore, a period in which a temperature at the center of the food decreases is lengthened, and as a result, the temperature stays long hours in a maximum ice crystal generation zone to generate large ice crystals or needle-shaped ice crystals. The generated ice crystals destroy the cells of the food to degrade quality thereof. As a result, the food, in particular, the food such as the meat or the fish, frequently drips after defrosting and nutrients escape. Therefore, the taste of the food deteriorates.

A technology is presented which supercools stored goods by controlling the temperature of the storage chamber by using supercooling in order to solve the problem.

The supercooling is a phenomenon in which, although a melted object or a solid object is cooled to a phase-transition temperature or lower in a balance state, the melted object or solid object is not changed. Since a material has a stable state depending on the temperature at the time, when the temperature is gradually changed, constituent atoms of the material may correspondingly follow a change in temperature while maintaining the stable state at each temperature. However, when the temperature is unexpectedly changed, since the constituent atoms have no spare time to be changed to the stable state depending on each temperature, the constituent atoms just maintain a stable state at a start-point temperature or some of the constituent atoms stop to not be changed to a state at an end-point temperature.

For example, when water is gradually cooled, the water is not temporarily solidified even though the temperature of the water becomes a temperature of 0° C. or lower. However, when an object is supercooled, the object enters a kind of semi-stable state, and as a result, an unstable balance state is broken even by minor stimulation, and as a result, the state of the object is easily transited to a more stable state. That is, when small pieces of the material are input to a supercooled liquid or the liquid is unexpectedly shaken, the liquid starts to solidify immediately, and as a result, the temperature of the liquid increases up to a solid point and the liquid maintains the stable balance state at the temperature.

A temperature condition should be well adjusted and the adjusted temperature condition should be continuously maintained in order to supercool the foods. However, cooling devices in the related art have difficulty in controlling the temperature of the storage chamber according to a supercooling temperature condition of the food, and in particular, it is very difficult to uniformly maintain a temperature distribution in the storage chamber, and a solution therefor is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a supercooling refrigerator and a method for controlling the same that are configured to supercool food such as fish or meat.

The present invention has also been made in an effort to provide a supercooling refrigerator and a method for controlling the same that are configured to more uniformly and stably maintain a temperature in a storage chamber in which food is supercooled.

An exemplary embodiment of the present invention provides a supercooling refrigerator including: a body including a storage chamber accommodating stored goods including fish or meat and storing the accommodated stored goods in a supercooled state; a door opening or closing an opened front surface of the body; a plurality of shelves disposed in multistages at predetermined intervals in the storage chamber, on which the goods are stored; a cooling unit cooling internal air of the storage chamber; a cool air supplying unit circulating the air cooled by the cooling unit to the inside of the storage chamber; and a cool air controlling unit controlling the temperature of the cool air supplied from the cool air supplying unit in a supercooling temperature range of the stored goods.

The cooling unit may include an evaporator installed at a lower end of the body to cool air through heat exchange, a cooling duct having the evaporator installed therein and connecting the inside of the storage chamber and the cool air supplying unit, a suction blower installed at one side of the cooling duct to suction the internal air of the storage chamber, a compressor circulating refrigerant to the evaporator, and a condenser.

The cool air supplying unit may include a supply duct that extends upward along an inner surface of the storage chamber, a supply blower installed at a lower end of the supply duct connected with the cooling duct to blow the cool air to the supply duct, and a plurality of holes that are formed on a front surface of the supply duct to discharge the cool air.

The cool air controlling unit may include a mixing unit supplying the internal air of the storage chamber to the cool air supplying unit to mix the internal air with the cool air as necessary, a temperature sensor installed in the supply duct to detect the temperature of the storage chamber, and a controller calculating the detection value of the temperature sensor to control the cooling unit, the cool air supplying unit, and the mixing unit so that the internal temperature of the storage chamber is within a predetermined temperature range.

The mixing unit may include a mixing blower installed between the lower end of the supply duct and the storage chamber to blow the internal air of the storage chamber to the supply duct.

The mixing unit may be installed in such a manner that the lower end of the supply duct simultaneously contact the storage chamber and the cooling duct and the supply blower may be installed in such a manner that a suction port simultaneously contacts the storage chamber and the cooling duct to blow the cool air of the cooling duct and the internal air of the storage chamber to the supply duct.

The holes may be distributively formed on the front surface of the supply duct at positions corresponding to upper spaces of the respective shelves.

The holes may be formed so that the formation number or the sizes of the holes increase from the lower part to the upper part of the storage chamber.

Frames may be installed in a vertical direction on at least four edges of the body, support members holding and supporting the shelves may be installed on the frames, and a pad for absorbing impact may be installed between the support member and the shelves.

The device may further include one or more curtains disposed consecutively in a vertical direction on the front surface of the storage chamber to block the front surface of the storage chamber.

The device may further include inner doors disposed at positions on the front surface of the storage chamber corresponding to the respective shelves and rotatably installed with respect to the storage chamber to open or close the storage chamber.

The device may further include an air curtain unit installed on the shelf and that injects air onto the front surface of the storage chamber in a vertical direction to shut off the front surface of the storage chamber.

The air curtain unit may include an air blower that is installed at a front end of the shelf and disposed on the front surface of the storage chamber and that suctions the cool air in the storage chamber and discharges the suctioned cool air in the vertical direction, and a power supply unit for supplying power to the air blower.

The air blower may be installed to extend along a front end of the shelf, and a suction port through which air is suctioned may be installed in a lower part thereof and a discharge port through which the suctioned air is discharged may be installed in an upper part in a vertical direction.

The power supply unit may include a connection connector installed on the shelf to receive power, and a supply connector installed in the storage chamber to receive the power and coupled to and electrically connected with the connection connector with the movement of the shelf.

The cool air controlling unit may further include a door sensor detecting opening or closing of the door, and the controller may stop driving the cooling unit, the cool air supplying unit, and the mixing unit at the time of opening the door depending on an output value of the door sensor.

The cool air controlling unit may actuate the air curtain unit at the time of opening the door or the inner door.

The cool air controlling unit may further include a heater installed in the heat exchanger or the supply duct to heat the cool air, and the controller may control the heater so that the internal temperature of the storage chamber is in the predetermined temperature range.

The cool air controlling unit may further include one or more heat pipes that extend vertically in the supply duct and are disposed at predetermined intervals.

The cool air controlling unit may control the internal temperature of the storage chamber in the range of 0 to $-20°$ C.

Another exemplary embodiment of the present invention provides a method for controlling a supercooling refrigerator storing foods including fish or meat in a storage chamber of a refrigerator in a supercooled state, the method including: in order to store the foods including the fish or meat stored in the storage chamber of the refrigerator, detecting the internal temperature of the storage chamber of the refrigerator; comparing the detected temperature value with a predetermined first temperature range upper limit value; supplying cool air to the storage chamber when the detected temperature value is equal to or higher than the first temperature range upper limit value; comparing the detected temperature value with a second temperature range when the detected temperature value is lower than the first temperature range upper limit value; controlling the temperature of the cool air supplied to the storage chamber when the detected temperature value is lower than a second temperature range upper limit value; detecting the internal temperature of the storage chamber and ending the controlling of the temperature of the cool air when the detected temperature value is lower than a second temperature range lower limit value; comparing the detected temperature value with a first temperature range lower limit value; stopping supplying the cool air when the detected temperature value is equal to or lower than the first temperature range lower limit value; and detecting the internal temperature of the storage chamber and continuously stopping the supply of the cool air when the detected temperature is lower than the first temperature range upper limit value and supplying the cool air to the storage chamber when the detected temperature is equal to or higher than the first temperature range upper limit value.

The second temperature range may be within the first temperature range.

The controlling of the temperature of the cool air may be performed by mixing the internal air of the storage chamber with the cool air supplied to the storage chamber.

The controlling of the temperature of the cool air may be performed by controlling a ratio of a supply amount of the cool air supplied to the storage chamber and a supply amount of internal air of the storage chamber, which is mixed with the cool air.

The controlling of the temperature of the cool air may be performed by controlling a heater installed on a supply duct to which the cool air is supplied.

According to exemplary embodiments of the present invention, at the time of storing fish, meat, and the like, tissue liquid is not frozen and protein and fatty tissue are thus not destroyed to prevent juices from escaping and maintain a fresh taste by maintaining softness of the food.

Further, a temperature in a storage chamber can be more uniformly and stably maintained according to a supercooling temperature of the food.

A feature of a chilled meat can be preserved while preventing various bacteria generated at a degree above zero from being bred.

The supercooling temperature can be stably maintained by minimizing a change in cool air in the storage chamber at the time of opening and closing the storage chamber.

BRIEF DESCRIPTION OF THE DRAWINGS

FIG. 7 is a schematic flowchart illustrating a method for controlling the supercooling refrigerator according to the first exemplary embodiment.

DETAILED DESCRIPTION OF THE EMBODIMENTS

Figure 1:
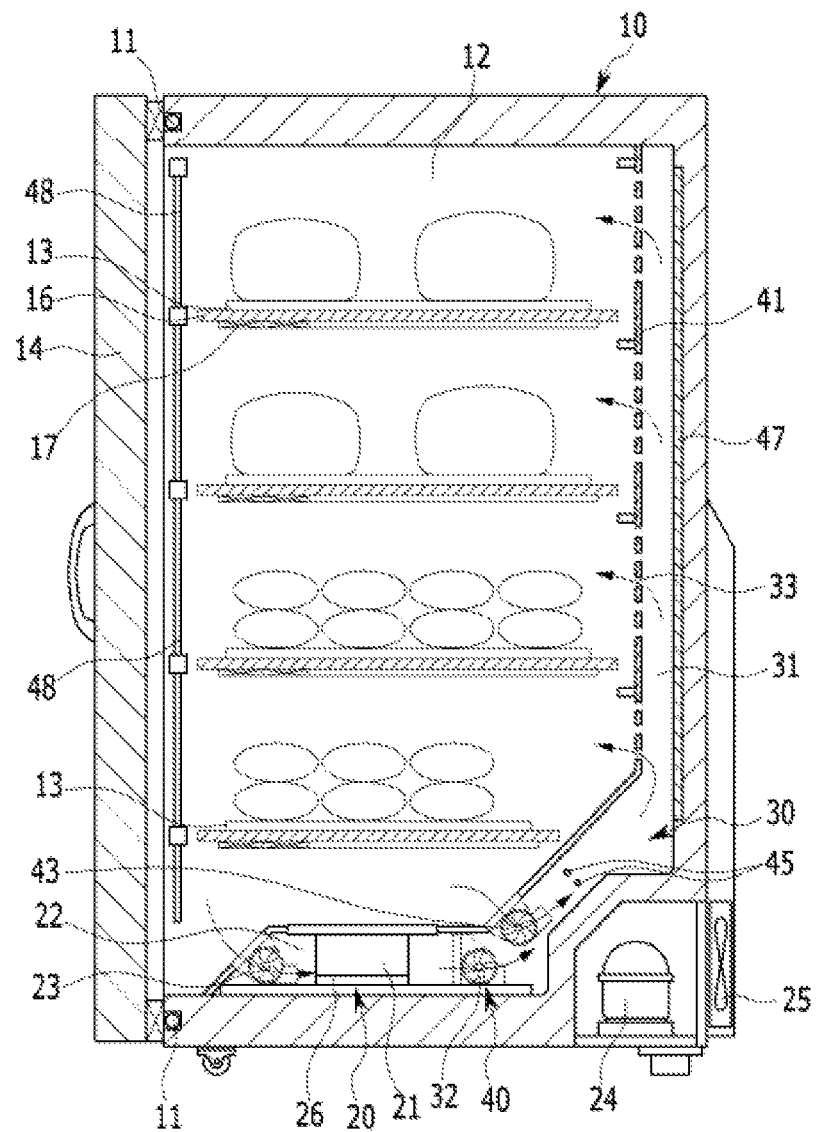
FIG. 1 is a schematic side cross-sectional view illustrating a supercooling refrigerator according to a first exemplary embodiment.

Hereinafter, exemplary embodiments of the present invention will be described so as to be easily implemented by those skilled in the art, with reference to the accompanying drawings. As is easily appreciated by those skilled in the art, exemplary embodiments to be described below may be modified to various forms within a limit without departing from the concept and the scope of the present invention. Like reference numerals refer to like elements throughout the drawings as much as possible.

Special terms to be used below are just used for mentioning a specific exemplary embodiment and are not intended to limit the present invention. Singular forms used herein also include plural forms as long as sentences do not represent a meaning which is clearly contrary thereto. A meaning of "including" used in the specification concretizes a specific feature, area, integer, step, operation, element, and/or component, and does not exclude existence or addition of another feature, area, integer, step, operation, element, component, and/or group.

All terms including technical terms and scientific terms to be used below have the same meanings as generally appreciated by those skilled in the art. Terms defined in a dictionary have meanings which coincide with related technical documents and current disclosed contents, and they are not be interpreted as ideal or very official meanings when they are not so defined.

FIG. 1 illustrates a supercooling refrigerator according to an exemplary embodiment.

Hereinafter, in the exemplary embodiment, a supercooling refrigerator 100 applied to fish or meat will be described as an example. However, the supercooling refrigerator 100 is not limited thereto, and may be applied to all foods including juice or coffee, a concentrate thereof, liquid beverages such as a carbonated drink, milk, water, and the like, agricultural products such as vegetables, fruits, and the like, fried foods, and the like in addition the fish or meat.

As illustrated in FIG. 1, the refrigerator 100 according to the exemplary embodiment stores and supercools the fish or the meat, or stores the fish or meat in a supercooled state. Hereinafter, the foods such as the fish or meat which are supercooled and stored are referred to as stored goods for ease of description.

To this end, the refrigerator 100 includes a body 10 including a storage chamber 12 accommodating the stored goods and storing the accommodated stored goods in the supercooled state, a door 14 opening and closing an opened front surface of the body 10, a plurality of shelves 16 disposed in the storage chamber 12 in multistages at predetermined intervals, on which the stored goods are laid, a cooling unit 20 for cooling air in the storage chamber 12, a cool air supplying unit 30 for circulating the air cooled by the cooling unit 20 to the inside of the storage chamber 12, and a cool air controlling unit 40 for controlling the temperature of the cool air supplied from the cool air supplying unit 30 in a supercooling temperature range of the stored goods.

The body 10 is formed as a quadrangular heat insulated structure in which the front surface is opened and other sides are closed. The door 14 is rotatably installed on the front surface of the body 10. The door 14 may have a heat insulated structure, and a transparent material forming a window may be added to the front surface of the door 14 so as to verify the contents.

The inside of the body 10 forms the storage chamber 12 which is a space accommodating the stored goods. The plurality of shelves 16 are disposed in a vertical direction at the predetermined intervals so that the stored goods are laid in the storage chamber 12 in the body 10. Herein, the vertical direction means a vertical direction to the ground when the refrigerator 100 is laid on the ground.

The shelves 16 are formed in a plane-shaped plate structure. A plurality of guide rails 13 may be arranged so that the cool air flows on the surfaces of the shelves 16. The guide rails 13 protrude upward at a predetermined interval, and grooves between the guide rails serve as passages through which the cool air flows. Therefore, when the stored goods are laid on the shelves, the stored goods are loaded on the guide rails 13 that protrude on the shelves 16 and the grooves between the guide rails maintain the cool air passage. Accordingly, the cool air is allowed to more smoothly flow through the passage between the guide rails.

Figure 2:
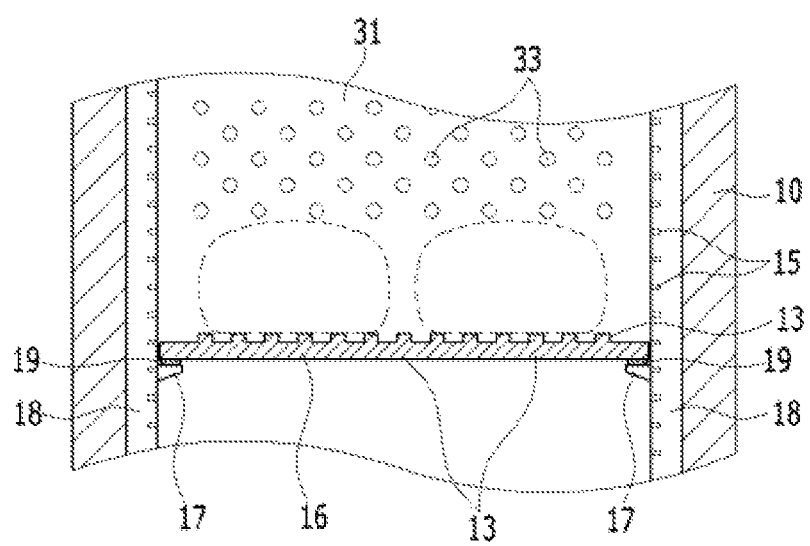
FIG. 2 is a schematic front view illustrating a partial configuration of the supercooling refrigerator according to the exemplary embodiment of FIG. 1.

As illustrated in FIG. 2, protruding support members 17 for holding and supporting the shelves 16 are installed on inner surfaces of the storage chamber 12, and face each other. The shelves 16 are supported over pairs of support members 17 installed on the inner surfaces of the storage chamber 12.

Herein, the stored goods are present in the supercooled state on the shelves, and when external shock is applied to the stored goods, water of the tissue is frozen. In the exemplary embodiment, the support members 17 are installed on a frame 18 provided in the body to secure a positive support force of the shelves. The frame 18 is installed at each of edges of the body constituting a quadrangular structure. The support member 17 that holds and supports the shelf is installed on each frame 18 to more stably support the shelf. Therefore, shaking of the shelves may be minimized. A pad 19 for absorbing an impact from the shelves is further installed on the top of the support member 17. The pad 19 may be made of an impact preventing material such as, for example, rubber, silicon, a gel, or the like.

Further, the position of the support member 17 may be controlled in the vertical direction of the storage chamber 12 as necessary so as to be detachably installed on the frame 18 of the storage chamber 12. Therefore, the interval or the positions of the respective shelves 16 may be appropriately controlled according to the sizes of the stored goods. To this end, holes 15 are formed on the frame 18 at intervals so that the support members 17 fit in the vertical direction. Therefore, the support member 17 fits in one side hole 15 in the vertical direction of the frame 18, and as a result, the shelf may be fixed at a desired position by moving the position of the support member 17.

The stored goods are conserved in the supercooled state to maintain an unfrozen state of the stored goods in the storage chamber 12 at a temperature below a freezing point of the stored goods or lower.

An internal temperature of the storage chamber 12 is controlled and maintained in the range of approximately 0 to 20° C. according to the supercooled condition of the fish or the meat which are the stored goods.

The cooling unit 20 is used to decrease the internal temperature of the storage chamber 12, and includes an evaporator 21 installed on the lower end of the body 10 to cool air, a cooling duct 22 having the evaporator 21 installed therein and connecting the inside of the storage chamber 12 and the cool air supplying unit 30, and a suction blower 23 installed at one side of the cooling duct 22 to suction the air in the storage chamber 12.

In the exemplary embodiment, the cooling duct 22 is disposed on the bottom of the storage chamber 12. The cooling duct 22 includes an inlet through which the air in the storage chamber 12 is suctioned and an outlet through which the cool air is discharged to the outside. The evaporator 21 for cooling the air in the storage chamber 12 is installed in the cooling duct 22. Therefore, the air that flows into the cooling duct 22 through the inlet is cooled while passing through the evaporator 21 to be discharged as the cool air through the outlet. The inlet of the cooling duct 22 is disposed at a front side of the storage chamber 12, at which the door 14 is installed The outlet of the cooling duct 22 is disposed at the inside of the storage chamber 12, which is an opposite side to the inlet. The suction blower 23 is installed at the inlet of the cooling duct 22. The suction blower 23 includes a cylindrical fan that elongates and has a suction port through which air is suctioned, which is formed at one side, and a discharge port through which air is discharged, which is formed at the other side.

In the suction blower 23, the suction port is disposed to face the inside of the storage chamber 12 and the discharge port is disposed to face the inside of the cooling duct 22. The suction blower 23 allows the air in the storage chamber 12 to be suctioned into the inside of the cooling duct 22. In the exemplary embodiment, as the suction blower 23 is used as a component that suctions the air through the inlet of the cooling duct, air that flows in and out is prevented from being mixed and the cool air may be accurately and constantly controlled and maintained. Further, a blowing area may be increased, air volume is easily added and removed by precisely controlling the speed of the blower, and noise caused by the air suction may be reduced.

The evaporator 21 cools surrounding air by a cooling action of absorbing surrounding latent heat while evaporating refrigerant in the cooling duct 22. A compressor 24 that is connected with the evaporator 21 to compress the refrigerant and a condenser 25 that condenses the refrigerant in a high-temperature high-pressure state and transfers the condensed refrigerant to the evaporator 21 are installed in a lower part of the body 10. As the cooling unit including the compressor and the condenser is disposed in the lower part of the body, vibration or noise may be further decreased and stability may be increased. The cooling unit may be disposed even in an upper part of the body in addition to the lower part of the body.

The cool air supplying unit 30 is connected with the discharge port of the cooling duct 22 to supply the cool air cooled while passing through the evaporator 21 to the inside of the storage chamber 12. To this end, the cool air supplying unit 30 includes a supply duct 31 that extends upward along the inner surface of the storage chamber 12, a supply blower 32 installed at a lower end of the supply duct 31 connected with the cooling duct 22 to blow the cool air to the supply duct 31, and a plurality of holes 33 formed on a front surface of the supply duct 31 to discharge the cool air.

In the exemplary embodiment, the supply duct 31 is installed on the inner surface of the storage chamber 12 in the vertical direction. The supply duct 31 location is not limited to the inner surface of the storage chamber 12, and may be installed on both lateral surfaces facing each other. The plurality of holes 33 for blowing the cool air into the storage chamber 12 are arranged on the front surface of the supply duct 31, that is, a surface facing the storage chamber 12.

As illustrated in FIG. 2, the holes 33 are formed at a position corresponding to an upper space of the shelf 16 for each shelf 16 disposed vertically. That is, when the holes 33 are formed to be inclined upward to face an upper side of the stored goods when the stored goods are laid on the shelf 16. The holes 33 may be uniformly distributed between both lateral surfaces in the width direction of the storage chamber 12. Further, the holes 33 are formed so that the formation number or the sizes of the holes 33 increase from the lower part to the upper part of the storage chamber 12. Therefore, the cool air transported from the lower part to the upper part through the supply duct 31 may be discharged at a substantially uniform amount through the hole 33 formed to correspond to each shelf 16 in the vertical direction of the storage chamber 12.

The cool air is jetted into the storage chamber 12 through the hole 33 to supercool the stored goods loaded on each shelf 16 of the storage chamber 12. The cool air jetted into the storage chamber 12 passes through the stored goods and thereafter is suctioned to the cooling duct through the inlet of the cooling duct 22 as described above.

The supply blower 32 is installed between the outlet of the cooling duct 22 and the lower end of the supply duct 31 to eject the cool air cooled while passing through the cooling duct 22 to the supply duct 31. The supply blower 32 includes a cylindrical fan that elongates and has a suction port through which air is suctioned, which is formed at one side, and a discharge port through which air is discharged, which is formed at the other side. In the supply blower 32, the suction port is disposed to face the inside of the cooling duct 22 and the discharge port is disposed to face the inside of the supply duct 31. The supply blower 32 transports the cool air from the cooling duct to the supply duct 31. In the exemplary embodiment, as the supply blower 32 is used as a component that supplies the cool air to the supply duct 31, a phenomenon in which the cool air or the air in the storage chamber flows in reversely is prevented, and the speed of the blower is controlled to accurately and constantly control and maintain a supply amount of the cool air. Further, the blowing area may be increased and noise may be reduced at the time of discharging the cool air.

Herein, this device mixes the air in the storage chamber 12 with the cool air through the cool air controlling unit 40 while supplying the cool air from the cooling duct 22 to the supply duct 31 to control the temperature of the cool air in the supercooling temperature range of the stored goods.

The cool air controlling unit 40 includes a mixing unit for supplying the air in the storage chamber 12 to the cool air supplying unit 30 and mixing the supplied air with the cool air as necessary, a temperature sensor 41 installed in the supply duct 31 to detect the temperature of the storage chamber 12, and a controller (see 42 of FIG. 3) controlling the cooling unit 20, the cool air supplying unit 30, and the mixing unit so that the temperature in the storage chamber 12 enters a predetermined temperature range by calculating a detection value of the temperature sensor 41.

In the exemplary embodiment, the mixing unit includes a mixing blower 43 installed between the lower end of the supply duct 31 and the storage chamber 12 to blow the air in the storage chamber 12 to the supply duct 31.

As illustrated in FIG. 1, the size of the lower end of the supply duct 31 is significantly larger than the discharge port of the cooling duct 22, and as a result, the lower end extends upward over the upper end of the cooling duct 22. Therefore, a part of the lower end of the supply duct 31 is in communication with the discharge port of the cooling duct 22 and the residual part is in communication with the storage chamber 12 outside the cooling duct. The mixing blower 43 is installed between the storage chamber 12 and the supply duct 31 to jet the air in the storage chamber 12 to the inside of the supply duct 31.

The mixing blower 43 includes a cylindrical fan that elongates and has a suction port through which air is suctioned, which is formed at one side, and a discharge port through which air is discharged, which is formed at the other side. In the mixing blower 43, the suction port is disposed to face the inside of the storage chamber 12 and the discharge port is disposed to face the inside of the supply duct 31.

Therefore, the cool air cooled by passing through the cooling duct 22 is jetted to the inside of the supply duct 31 through the supply blower 32, and some of the air in the storage chamber 12 does not pass through the cooling duct 22 but is directly suctioned to the inside of the supply duct 31 through the mixing blower 43. Therefore, the cool air passing through the evaporator 21 and the air in the storage chamber 12 are mixed in the supply duct 31, and the mixed cool air is supplied to the inside of the storage chamber 12 through the supply duct 31.

In the exemplary embodiment, the cool air controlling unit 40 controls and operates the mixing blower 43 according to the temperature in the storage chamber 12 to control the temperature in the storage chamber 12.

The temperature sensor 41 is installed at one side of the supply duct 31 to detect the temperature in the storage chamber 12. The temperature sensor 41 may be installed at a position corresponding to each shelf 16. The controller 42 drives the compressor 24 according to a detection result of the temperature sensor 41 to form the cool air by using the evaporator 21, or controls the air flow rate of the mixing blower 43 or the supply blower 32 to control the temperature in the storage chamber 12.

Further, a door sensor 44 is installed at one side of the door 14 or the body 10, which detects opening or closing of the door 14. The controller 42 may stop driving of the cooling unit 20, the cool air supplying unit 30, and the mixing unit at the time of opening the door 14 according to an output value of the door sensor 44. That is, when the door 14 is opened, the controller 42 forcibly stops driving of each blower and the compressor 24 according to an output signal of the door sensor 44.

Further, the cool air controlling unit 40 may further include a heater 45 that is installed in the supply duct 31 to heat the cool air in order to control the temperature of the cool air. The heater 45 is formed by a heat wire that converts electrical energy into thermal energy and is installed inside the lower end of the supply duct 31.

When the heater 45 is actuated, the temperature of the mixed cool air is increased to prevent the temperature in the storage chamber 12 from being rapidly decreased and to appropriately control the cool air according to the supercooling temperature range of the stored goods. Further, the temperature of the cool air may be controlled and frost generated in the evaporator may be removed. A heater 26 may be further installed in the evaporator 21 in order to remove the frost. Further, a heater 11 is installed on a door-side front surface of the body 10 to prevent the frost from being generated on the front surface by a difference in temperature between the inside and the outside at the time of opening the door.

Figure 3:
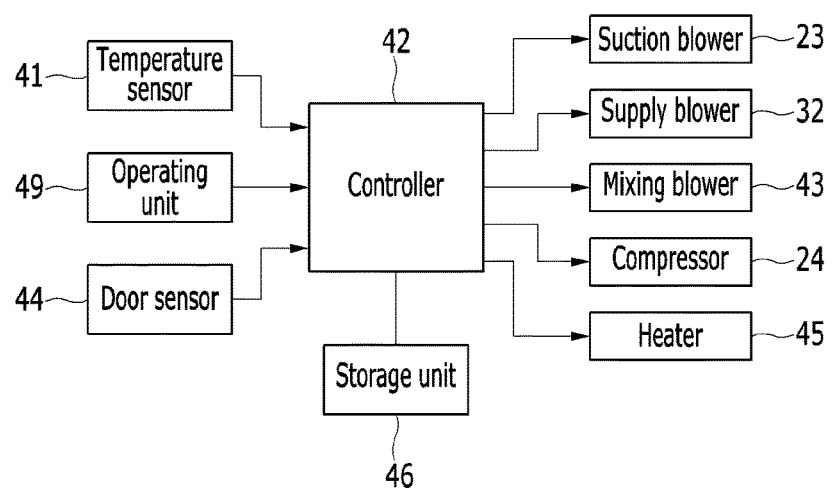
FIG. 3 is a schematic block diagram illustrating a control structure of the supercooling refrigerator according to the first exemplary embodiment.

FIG. 3 illustrates a control structure for maintaining supercooling of the stored goods stored in the device through the controller 42.

In the exemplary embodiment, the controller 42 of the cool air controlling unit 40 receives signals of the temperature sensor 41 and the door sensor 44, and an operation unit for temperature setting, to compare the received signals with data recorded in a storage unit 46.

The controller 42 controls and operates the supply blower 32, the suction blower 23, the mixing blower 43, the compressor 24, or the heater 45 based on the comparison result to control the temperature in the storage chamber 12 within a predetermined temperature range according to the supercooling temperature of the stored goods.

The controller 42 controls and operates the mixing blower 43 or the heater 45 to maintain the temperature to prevent the temperature from being rapidly changed when the temperature of the storage chamber 12 is within the supercooling temperature range of the stored goods. The air flow rates of the mixing blower 43 and the supply blower 32 are closely associated with the temperature control of the storage chamber 12, which will be described below in detail.

As described above, the mixed cool air is supplied to the storage chamber 12 through the holes 33 of the supply duct 31 to supercool the stored goods loaded on each shelf 16 of the storage chamber 12. In addition, the mixed cool air falls to the lower part of the storage chamber 12 to be suctioned into the cooling duct 22 by driving the suction blower 23 installed in the cooling duct 22. The air suctioned into the cooling duct 22 is cooled while passing through the evaporator 21 and the cool air is mixed with the air in the storage chamber 12, which is suctioned into the supply duct 31, by driving the mixing blower 43 again. The mixed cool air is supplied to the storage chamber 12 in order to cool the stored goods through the holes 33 of the supply duct 31 again. This device cools the stored goods through circulation of the air, and the temperature of the cool air is controlled through the cool air controlling unit 40 during this process to more easily and certainly maintain the stored goods in the supercooled state.

Further, the cool air controlling unit 40 may further include one or more heat pipes 47 that extend in a vertical direction in the supply duct 31 and are disposed at predetermined intervals in the width direction of the storage chamber 12.

In the heat pipes 47, the inside of a sealing container is filled with an operating fluid which is phase-changed between gas and liquid and heat is rapidly transferred between both ends of the container through the phase-change process of the operating fluid. The heat pipe 47 is installed on the inner surface of the supply duct 31 to uniformly maintain the temperature of the mixed cool air by minimizing a decrease in temperature of the mixed cool air while the mixed cool air moves in the vertical direction of the supply duct 31. Therefore, the temperature change of the mixed cool air is minimized in the supply duct 31. Accordingly, the temperature of the cool air discharged to each shelf 16 through each hole 33 is generally uniform in the longitudinal direction of the supply duct 31, and the temperature change of the entirety of the storage chamber 12 is also minimized.

Further, this device additionally includes one or more blocking members 48 that are consecutively disposed on the front surface of the storage chamber 12 in the vertical direction to block the storage chamber 12, in order to minimize the temperature change of the storage chamber 12.

In the exemplary embodiment, the blocking member 48 may be formed by a curtain. The curtain is disposed at a position of the front surface of the storage chamber corresponding to each shelf to block the opened front surface of the storage chamber 12 at a front side of each shelf. The curtain minimizes flowing of outdoor air into the storage chamber 12 at the time of opening the door 14. Therefore, an increase in temperature of the storage chamber 12 depending on opening or closing of the door 14 may be suppressed.

The curtain may be made of, for example, a transparent vinyl resin having flexibility even at a low temperature, and the like. The curtain has a structure in which the top of the curtain is installed on a pole supported on both lateral surfaces of the storage chamber 12 to hang down. The curtain is cut in the vertical direction at predetermined intervals. Therefore, the cut curtain is drawn back to easily extract the stored goods or put the stored goods in the storage chamber 12.

Further, in the exemplary embodiment, the blocking member 48 may be formed by an inner door provided inside the door. The inner door is configured to be disposed at the position of the front surface of the storage chamber corresponding to each shelf and rotatably installed with respect to the storage chamber to open or close the storage chamber.

Therefore, the inner door prevents the outdoor air from flowing into the storage chamber 12 at the time of opening the door 14. In addition, since the stored goods may be extracted or put in by opening only the inner door disposed on the corresponding shelf, a temperature change of stored goods on another shelf may be minimized.

Meanwhile, this device may further include an air curtain unit that is installed on the shelf and injects air on the front surface of the storage chamber in the vertical direction to block the loss of the cool air on the front surface of the storage chamber.

Figure 4:
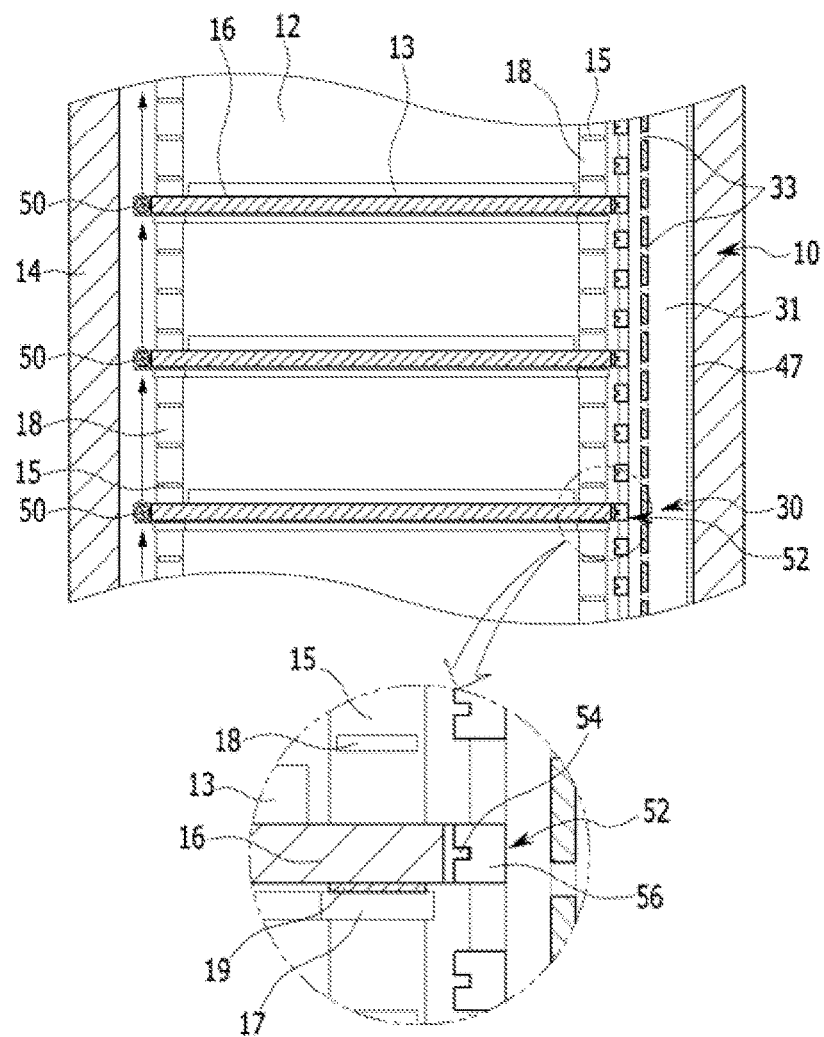
FIG. 4 is a schematic side view illustrating a structure of an air curtain unit of the supercooling refrigerator according to the first exemplary embodiment.
Figure 5:
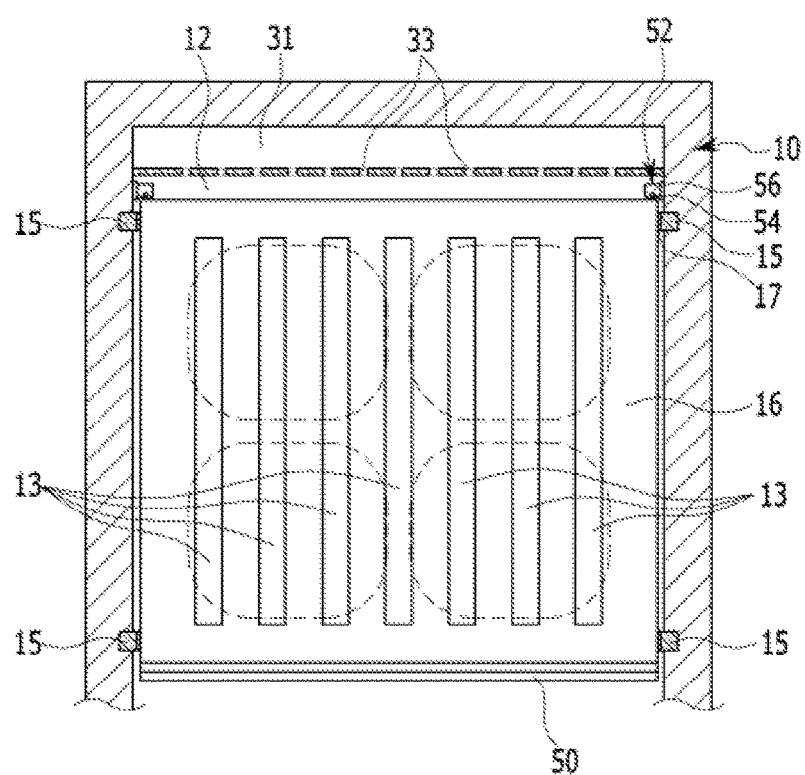
FIG. 5 is a schematic plan side view illustrating a structure of an air curtain unit of the supercooling refrigerator according to the first exemplary embodiment.

FIGS. 4 and 5 illustrate a structure of the air curtain unit according to the exemplary embodiment.

As illustrated in FIGS. 4 and 5, the air curtain unit may include an air blower 50 that is installed at a front end of the shelf 16 and disposed on the front surface of the storage chamber 12, and that suctions the cool air in the storage chamber and discharges the suctioned cool air in the vertical direction, and a power supply unit 52 for supplying power to the air blower 50.

The air blower 50 is installed to extend along the front end of the shelf 16. The air blower 50 includes a cylindrical fan, and has a suction port through which the cool air is suctioned which is formed at one side, and a discharge port through which the cool air is discharged which is formed at the other side. In the exemplary embodiment, the suction port of the air blower 50 is installed to face the lower part and the discharge port that discharges the cool air is installed in the vertical direction to face the upper part.

Therefore, the air blower 50 suctions the cool air in the storage chamber 12 in the lower part to inject the cool air to the upper part in the vertical direction. Accordingly, the cool air flows in the vertical direction on the front surface of the shelf and the flow of the cool air operates as if the curtain is drawn on the front surface of the storage chamber.

Even when the air blower 50 is installed on each shelf 16 and the position of the shelf is thus moved in the storage chamber, the cool air is caused to flow on the front surface of the shelf.

Even when the power supply unit 52 moves vertically along the frame 18 of each shelf 16, the power supply unit 52 is configured to apply power to the air blower 50 regardless of the movement.

To this end, the power supply unit 52 includes a connection connector 54 installed at a rear end of the shelf 16 to receive the power, and a supply connector 56 installed in the storage chamber 12 to receive the power and coupled to and electrically connected with the connection connector 54.

The supply connector 56 is connected with the power applied to the body 10 to receive electrical power. The supply connector 56 is installed at a position corresponding to the connection connector 54 inside the storage chamber 12. Further, multiple supply connectors 56 are installed at predetermined intervals in the vertical direction of the storage chamber to correspond to each movement position of the shelf 16. Therefore, when the support member 17 is moved and fixed at a desired position of the frame 18 and then the shelf 16 is pushed to the rear side from the front side throughout the support member 17, the connection connector 54 installed on the shelf is electrically connected while engaging with the supply connector 56.

Therefore, the power is applied to the air blower 50 electrically connected to the connection connector through the supply connector 56 and the connection connector 54. Accordingly, an air curtain formed by the cool air may be formed on the front side of the shelf by driving the air blower 50 regardless of the position of the shelf.

The air blower 50 is actuated at the position of a used shelf only at the time of opening the door 14 or the blocking member 48 and stops being driven when the door or the blocking member is closed, by controlling the power applied to the supply connector.

Figure 6:
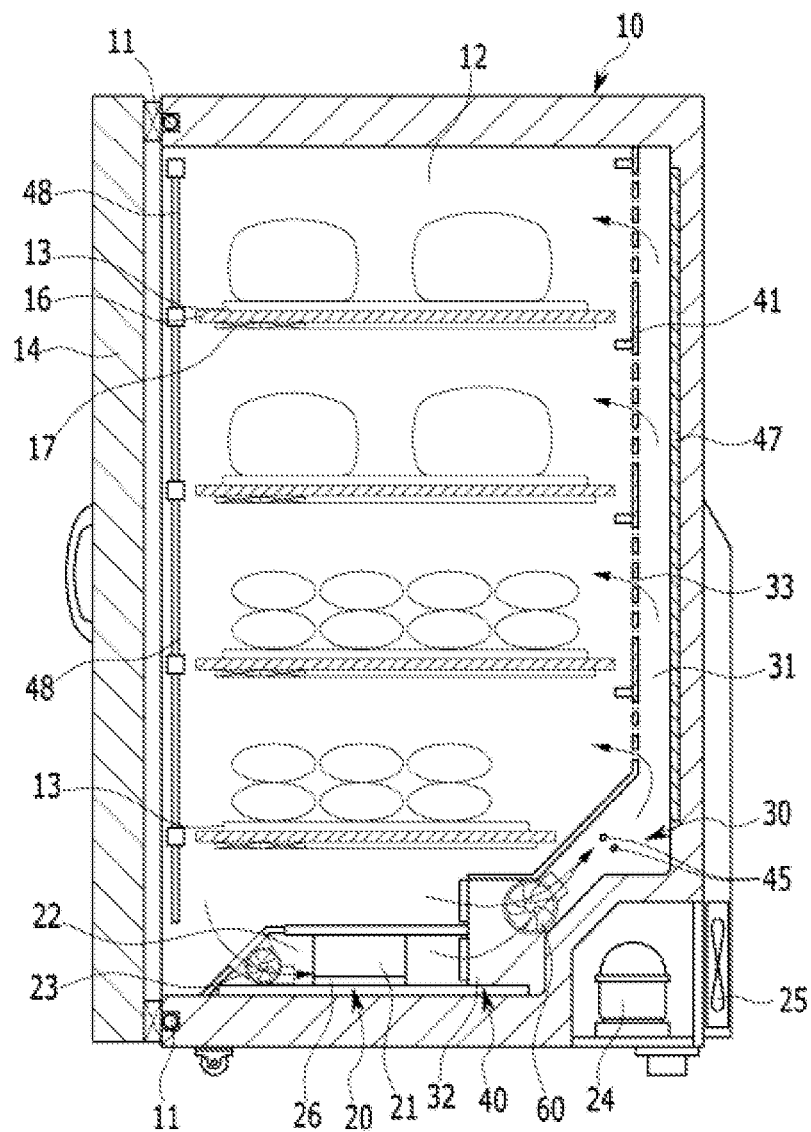
FIG. 6 is a schematic side view illustrating a supercooling refrigerator according to a second exemplary embodiment.

FIG. 6 illustrates another exemplary embodiment of the device.

Hereinafter, in the exemplary embodiment, this device has the same structure as the device described above in terms of other components, except for the structure of the mixing unit of the cool air controlling unit 40. Therefore, like reference numerals refer to like elements and a detailed description thereof will be omitted.

As illustrated in FIG. 6, in the exemplary embodiment, the mixing unit has a structure in which the lower end of the supply duct 31 is installed to simultaneously contact the storage chamber 12 and the cooling duct 22, a supply blower 60 is installed at the discharge port of the cooling duct 22, and the supply blower 60 is installed to simultaneously contact the storage chamber 12 and the cooling duct 22 to blow the cool air of the cooling duct 22 and the air in the storage chamber 12 to the supply duct 31. Herein, the simultaneous contact means that the suction port provided in the supply blower 32 is connected with both the cooling duct 22 and the storage chamber 12. In addition, the discharge port of the supply blower 60 is connected with the supply duct 31.

In the exemplary embodiment, some of the air in the storage chamber 12 may be mixed with the cool air of the cooling duct 22 only by the supply blower 60.

Therefore, the cool air cooled by passing through the cooling duct 22 is jetted to the inside of the supply duct 31 through the supply blower 60, and some of the air in the storage chamber 12 is also suctioned to the inside of the supply duct 31 through the supply blower 60. Therefore, the cool air passing through the evaporator 21 and the air in the storage chamber 12 are mixed in the supply duct 31, and the mixed cool air is supplied to the inside of the storage chamber 12 through the supply duct 31.

Hereinafter, a control process of the supercooling refrigerator according to the exemplary embodiment will be described with reference to FIG. 7. Hereinafter, the refrigerator control process will be described by using the refrigerator according to the exemplary embodiment of FIG. 1 as an example.

When the refrigerator 100 is actuated, the temperature in the storage chamber 12 is detected by the temperature sensor 41. A temperature value detected by the temperature sensor 41 is applied to the controller 42. The controller 42 compares a detected actual temperature value of the storage chamber 12 with a set temperature value recorded in the storage unit 46.

A temperature range for controlling the supercooling temperature of the stored goods is recorded in the storage unit 46, and this is changed as necessary according to the corresponding stored goods through the operating unit 49 connected to the controller 42.

In the exemplary embodiment, the temperature range stored in the storage unit 46 is divided into a first temperature range for determining whether to supply the cool air and a second temperature range for controlling the temperature of the cool air. The controller 42 supplies or stops supplying the cool air when the corresponding temperature range deviates from the first temperature range. The controller 42 controls the temperature of the cool air supplied to the storage chamber 12 so that the temperature in the storage chamber 12 does not rapidly decrease as the cool air is supplied within the second temperature range.

The first temperature range is set to a temperature range for maintaining the stored goods in the supercooled state. In the exemplary embodiment, the first temperature range is set to 0 to −20° C. which is the supercooling temperature range for the fish or the meat. The second temperature range is set to be within the first temperature range. For example, the second temperature range may be set to a range of 80% of the first temperature range. That is, when the first temperature range is between 0 and −20° C., the second temperature range is set between −2 and −18° C.

The controller 42 compares the detected temperature value with a predetermined first temperature range and supplies the cool air to the storage chamber 12 when the detected temperature is equal to or more than a first temperature range upper limit value. When the suction blower 23 is driven according to a control signal of the controller 42, the air in the storage chamber 12 is suctioned into the cooling duct 22. In addition, when the compressor 24 is driven, heat is exchanged through the evaporator 21, and as a result, the cool air is formed. The cool air is ejected to the supply duct 31 as the supply blower 32 installed at an outlet side of the cooling duct 22 is driven. The cool air supplied to the supply duct 31 is ejected to the inside of the storage chamber 12 through the holes 33 formed in the supply duct 31 as the cool air moves upward along the supply duct 31 to decrease the temperature in the storage chamber 12 to the supercooling temperature range of the stored goods. Therefore, the goods stored on the shelf 16 are in the supercooled state in the storage chamber 12.

The controller 42 continuously detects the temperature in the storage chamber 12 and compares to determine whether the detected temperature is lower than an upper limit value of the second temperature range. When the detected temperature is equal to or higher than the upper limit value of the second temperature range, the process is continuously repeated, and when the detected temperature is lower than the upper limit value of the second temperature range, the temperature of the cool air is controlled.

The temperature of the cool air is controlled by controlling an air flow rate depending on driving of the supply blower 32 and the mixing blower 43 or driving the heater 45.

When the controller 42 drives the heater 45, the temperature of the cool air increases while the cool air blown to the supply duct 31 passes through the heater 45 installed in the supply duct 31. Therefore, the cool air of which the temperature is increased by the heater 45 is supplied into the storage chamber 12. As the cool air is supplied to the storage chamber 12 by increasing the temperature of the cool air through controlling the heater 45, the temperature in the storage chamber 12 does not rapidly decrease but gently decreases. Accordingly, the supercooling temperature for the stored goods may be more consistently and stably maintained. Moreover, a time interval between driving and stopping of the compressor 24 for supplying the cool air is increased to minimize a failure by frequent on/off driving of the compressor 24 and prevent frost of the evaporator from being generated.

The controller 42 drives the mixing blower 43 in addition to driving of the heater 45 to control the temperature of the cool air. When the mixing blower is driven, some of the air in the storage chamber 12 does not pass through the cooling duct 22 but is directly suctioned to the supply duct 31 through the mixing blower 43. While the cool air passing through the cooling duct 22 is supplied to the supply duct 31, the cool air is not cooled as described above and the air in the storage chamber 12, which has a higher temperature than the cool air, is supplied to the supply duct 31, and as a result, the cool air and the air are mixed in the supply duct 31. Therefore, the cool air is mixed with the air which has a high temperature, and as a result, the temperature of the cool air increases. Accordingly, the mixed air of which the temperature increases is supplied into the storage chamber 12 as compared with the cool air. As the cool air is supplied to the storage chamber 12 by increasing the temperature of the cool air through driving the mixing blower 43, the supercooling temperature for the stored goods may be more consistently and stably maintained without a rapid change in temperature.

Herein, the controller 42 controls the air flow rate of the mixing blower 43 and the air flow rate of the supply blower 32 to more precisely control the temperature of the mixed cool air. For example, when the temperature of the cool air is intended to be more gently changed, the air flow rate of the mixing blower 43 is made to be higher than the air flow rate of the supply blower 32 to increase the amount of the air mixed with the cool air. Therefore, the amount of the air is larger than the amount of the cool air blown to the supply duct 31 to further increase the temperature of the mixed cool air. The temperature of the mixed cool air is precisely controlled by controlling the air flow rates of the cool air and the air to more gently and consistently maintain the change in temperature in the storage chamber 12.

Meanwhile, the controller 42 checks whether the temperature in the storage chamber 12 detected through the control process of the temperature of the cool air deviates from a lower limit value of the second temperature range. The controller 42 stops controlling the temperature of the cool air when the detected temperature deviates from the lower limit value of the second temperature range. As the control of the cool air temperature stops, only low-temperature cool air is supplied to the storage chamber 12. Therefore, the temperature in the storage chamber 12 rapidly decreases and the controller 42 checks whether the detected temperature deviates from a lower limit value of the first temperature range to stop supplying the cool air when the detected temperature deviates from the lower limit value of the first temperature range.

The controller 42 stops driving the compressor 24 and each blower to shut off supply of the cool air to the storage chamber 12.

While the supply of the cool air stops, the temperature in the storage chamber 12 gradually increases. The controller 42 consistently detects the temperature in the storage chamber 12 through the temperature sensor 41. The controller 42 compares the detected temperature in the storage chamber 12 and the first temperature range, and when the temperature value increases to the upper limit value of the first temperature range or higher, the controller 42 resumes supplying the cool air.

The temperature in the storage chamber 12 may be stably maintained according to the supercooling temperature condition of the stored goods through controlling the temperature of the cool air.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: Body 11: Heater
12: Storage chamber 13: Guide rail
14: Door 15: Hole
16: Shelf 17: Support member
18: Frame 19: Pad
20: Cooling unit 21: Evaporator
22: Cooling duct 23: Suction blower
24: Compressor 25: Condenser
30: Cool air supplying unit 31: Supply duct
32: Supply blower 33: Hole
40: Cool air controlling unit 41: Temperature sensor
42: Controller 43: Mixing blower
44: Door sensor 45: Heater
46: Storage unit 47: Heat pipe
48: Blocking member 49: Operating unit
50: Air blower 52: Power supply unit
54: Connection connector 56: Supply connector
60: Supply blower

What is claimed is:

1. A method for controlling a supercooling refrigerator storing foods including fish or meat stored in a storage chamber of the refrigerator in a supercooled state, the method comprising:
    detecting the internal temperature of the storage chamber of the refrigerator;
    comparing the detected temperature value with a predetermined first temperature range upper limit value;
    supplying cool air to the storage chamber when the detected temperature value is equal to or higher than the first temperature range upper limit value;
    comparing the detected temperature value with a second temperature range when the detected temperature value is lower than the first temperature range upper limit value;
    controlling the temperature of the cool air supplied to the storage chamber when the detected temperature value is lower than a second temperature range upper limit value;
    detecting the internal temperature of the storage chamber and ending the controlling of the temperature of the cool air when the detected temperature value is lower than a second temperature range lower limit value;
    comparing the detected temperature value with a first temperature range lower limit value;
    stopping supplying the cool air when the detected temperature value is equal to or lower than the first temperature range lower limit value; and
    detecting the internal temperature of the storage chamber and continuously stopping the supply of the cool air when the detected temperature is lower than the first temperature range upper limit value and supplying the cool air to the storage chamber when the detected temperature is equal to or higher than the first temperature range upper limit value.

2. The method of claim 1, wherein the second temperature range is within the first temperature range.

3. The method of claim 2, wherein the controlling of the temperature of the cool air is performed by mixing the internal air of the storage chamber with the cool air supplied to the storage chamber.

4. The method of claim 2, wherein the controlling of the temperature of the cool air is performed by controlling a ratio of a supply amount of the cool air supplied to the storage chamber and a supply amount of internal air of the storage chamber, which is mixed with the cool air.

5. The method of claim 4, wherein the controlling of the temperature of the cool air is performed by controlling a heater installed on a supply duct to which the cool air is supplied.

6. The method of claim 5, further comprising forming an air curtain by controlling and operating an air blower installed at a front end of a shelf of the refrigerator when the storage chamber of the refrigerator is opened.

* * * * *